United States Patent [19]

Rapp et al.

[11] 4,268,389
[45] May 19, 1981

[54] SEWAGE TREATMENT

[75] Inventors: Walter W. Rapp; Gary A. Crosby, both of New Iberia, La.

[73] Assignee: Red Fox Industries Inc., New Iberia, La.

[21] Appl. No.: 95,107

[22] Filed: Nov. 16, 1979

[51] Int. Cl.³ .............................. C02F 3/20; C02F 3/22
[52] U.S. Cl. ................................. 210/195.3; 210/197; 210/202; 210/218; 210/220; 210/256; 210/261
[58] Field of Search .................. 210/170, 195.3, 195.4, 210/197, 202, 218, 220, 221 R, 256, 261

[56] References Cited

U.S. PATENT DOCUMENTS

| Re. 26,931 | 7/1970 | Valdespino | 210/261 X |
|---|---|---|---|
| 1,642,206 | 9/1927 | Imhoff | 210/197 |
| 2,413,838 | 1/1947 | Mallory | 210/197 X |
| 2,709,680 | 5/1955 | Watson | 210/220 X |
| 2,769,546 | 11/1956 | Fontein | 210/512 X |
| 2,901,114 | 8/1959 | Smith et al. | 210/220 X |
| 3,220,706 | 11/1965 | Valdespino | 210/195.3 X |
| 3,271,304 | 9/1966 | Valdespino et al. | 210/197 X |
| 3,285,422 | 11/1966 | Wiley | 210/512 |
| 3,298,526 | 1/1967 | Valdespino et al. | 210/197 X |
| 3,335,865 | 8/1967 | Cawley et al. | 210/195.3 X |
| 3,347,784 | 10/1967 | Kappe | 210/195.4 X |
| 3,397,789 | 8/1968 | Valdespino | 210/195.3 X |
| 3,415,381 | 12/1968 | Thayer | 210/195.3 X |
| 3,419,146 | 12/1968 | Koulovatos | 210/195.3 X |
| 3,497,064 | 2/1970 | Valdespino | 210/256 X |
| 3,535,234 | 10/1970 | Gilwood | 210/195.3 X |
| 3,552,725 | 1/1971 | Ray | 261/120 X |
| 3,744,634 | 7/1973 | Schlenz | 210/197 X |
| 3,753,897 | 8/1973 | Lin et al. | 210/197 X |
| 3,764,011 | 10/1973 | Owens | 210/197 X |
| 3,819,053 | 6/1974 | Milotich | 210/512 X |
| 3,992,299 | 11/1976 | Wray | 210/195.3 X |
| 3,997,437 | 12/1976 | Prince et al. | 210/195.3 X |

FOREIGN PATENT DOCUMENTS

| 1190405 | 4/1965 | Fed. Rep. of Germany | 210/195.3 |
|---|---|---|---|
| 122428 | 1/1919 | United Kingdom | 210/220 |

Primary Examiner—Robert H. Spitzer
Attorney, Agent, or Firm—Wilkinson, Mawhinney & Theibault

[57] ABSTRACT

The present disclosure is directed to a sewage treatment device of the marine type and operates on an extended aeration principle employing an aerator, clarifier and disinfector. The clarifier is disposed beneath the aerator and the top of the clarifier with a common wall therebetween which forms the bottom of the aerator. A first passage conducts fluid from the aerator to the clarifier and has a central port in the common wall. A second passage conducts fluid from the clarifier to the disinfector. The aerator has an influent inlet and the disinfector has an effluent outlet.

The treator includes in the aerator vessel nozzle means for admitting air to the vessel in a direction to cause fluid in the vessel to move orbitally about a vertical axis with the nozzle means being disposed at a level proximate the common wall between the aerator and clarifier.

10 Claims, 8 Drawing Figures

FIG. 6

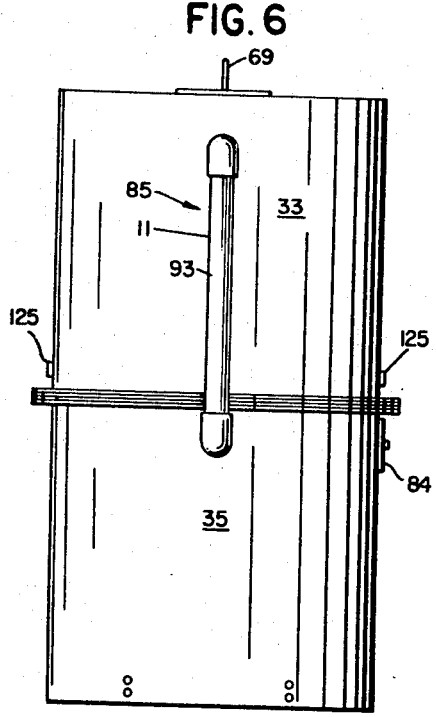

FIG. 7

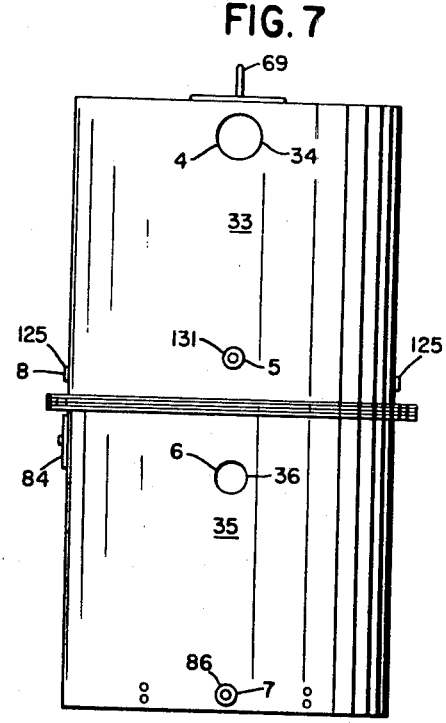

FIG. 8
BILL OF MATERIALS

| REF. NO. | NO. REQ'D | DESCRIPTION |
|---|---|---|
| 1 | | AIR VENT - 2" N.P.T. |
| 2 | | SLUDGE RETURN - 2" N.P.T. |
| 3 | | ACCESS HATCH |
| 4 | | 3" INLET |
| 5 | | 1" DRAIN N.P.T. W/ PLUG |
| 6 | | 2" DISCHARGE |
| 7 | | 1" DRAIN N.P.T. W/ PLUG |
| 8 | 2 | 1/2" N.P.T. |
| 9 | | INSPECTION AND FLUSHING CONNECTION - 4" N.P.T. W/ PLUG |
| 10 | | CROSSOVER MANIFOLD - 2" N.P.T. |
| 11 | | CROSSOVER MANIFOLD |
| 12 | | SLUDGE RETURN |
| 13 | | AIR LINE - 1/2" PIPE |
| 14 | | DIFFUSER JET |
| 15 | | ANTISYPHON AND FILLING VENT - 1/2" PIPE |
| 16 | | 2" COMPRESSION COUPLING |
| 17 | | CLARIFIER BAFFLE - 12" PIPE |
| 18 | | 2" N.P.T. |
| 19 | | 1" DRAIN N.P.T. |
| 20 | | CLARIFIER TOP PLATE |
| 22 | | ALTERNATE CONNECTION FOR DISINFECTANT |

SEWAGE TREATMENT

BACKGROUND OF THE INVENTION

This invention relates to sewage treatment and more particularly to method and apparatus for treatment of sewage on board ship employing the extended aeration principle.

Some examples of prior art devices for the treatment of sewage are disclosed in U.S. Pat. Nos.

2,709,680—Watson (marine)
2,901,114—Smith et al (concentric)
3,497,064—Valdespino (nested cone and cylinder)
3,552,725—Ray (rotor)

The Smith patent represents an effort to reduce treater size. The various chambers, however, are all of different diameters requiring a large inventory of parts. The air diffuser is said to create a rolling motion of the sewage in the aerator and to cause the contents of the stabilizer to rotate prior to discharge of the sludge therein back to the aerator. It does not appear that the motion imparted to the sewage in the Smith et al treater is other than to increase air-solids contact.

The rotor of the Ray treater appears to be for the purpose of enhancing air circulation above a sewage pond.

The Valdespino treater includes an aerator disposed at a distance from a nested clarifier and chlorinator, with all three units having different diameters.

The Watson treater includes a power driven mechanical rotary agitator having blades to agitate the sewage. However, no aerator is included, merely subsequent stages of chemical treatment.

Other sewage treaters are discussed in the copending applications hereinafter mentioned and in the patents cited relative thereto.

Difficulties with prior treaters include cost, required variety of factory inventory, and size. An object of the present invention is to overcome these difficulties and still provide a highly efficient treater suitable for use on shipboard where the treater is subject to repeated changes of inclination.

SUMMARY OF THE INVENTION

According to the invention a treater comprises two mug-shaped cylindrical vessels or modules disposed lip to lip with a flat disc having its outer periphery or lip captured between the vessel lips separating the mugs to form a clarification chamber in the lower upright vessel and an aeration chamber in the upper inverted vessel. A truncated cone-shaped cup is nested in the lower vessel to form a chlorination chamber therebetween, the cup lip also being captured between the vessel lips, all four lips being bolted together. Tangential nozzles at the bottom of the aeration chamber cause centrifugal separation as well as maceration and enhanced bacterial reduction of sewage. Low density solid suspensions discharge from the aeration chamber through a central port surrounded by a cylindrical baffle rising above the air nozzle level to help guide aerator fluid into a circular motion. Fine solid suspension fluid passing through the central port at the bottom of the aeration chamber into the clarification chamber is guided to the bottom of the chamber by a skirt baffle depending from the periphery of the central port, leaving the top of the clarification chamber in a quiescent state. Liquid flows from the clarification chamber to the chlorination chamber through a standpipe in the aeration chamber, a cross-over pipe in the aeration chamber (which has an antisiphon vent to the aeration chamber) and an external downcomer diametrically opposite from the standpipe with respect to the cylinder axis of the treater. A sludge return line extends concentrically from near the bottom of the clarification chamber to the upper part of the aeration chamber and discharges near a sewage inlet at the top of the aeration chamber. An airlift pipe extends concentrically through the sludge return line. A sodium hypochlorite tank outside the aerator feeds by gravity through an adjustable needle-valve into the downcomer of directly into the side of the chlorination compartment. Chlorinated effluent discharges from the treater by overflowing through a port in the lower vessel near the top of the chlorination chamber. Suitable ports are provided for initially venting the chlorination compartment, for continuously venting the aeration chamber, and for cleaning out the treater, the guide baffle in the aeration chamber being slotted to allow complete drainage.

BRIEF DESCRIPTION OF THE DRAWINGS

For a detailed description of a preferred embodiment of the invention reference will be made to the accompanying drawings wherein:

FIG. 6 is a rear view of the treater;

FIG. 7 is a front view of the treater; and

FIG. 8 is a bill of materials for the treater.

The drawings are to scale, certain typical dimensions being indicated thereon. Generally speaking, the treater is about five feet high. The conventions of the U.S. Patent and Trademark Office for patent cases relative to identification of materials have been employed, from which it can be seen that the treater is made substantially entirely of non-metallic material, e.g., high density polyethylene. Typically the material will be plastics or other corrosion resistant material.

DESCRIPTION OF THE PREFERRED EMBODIMENT

Modular Vessels

Figure 1:
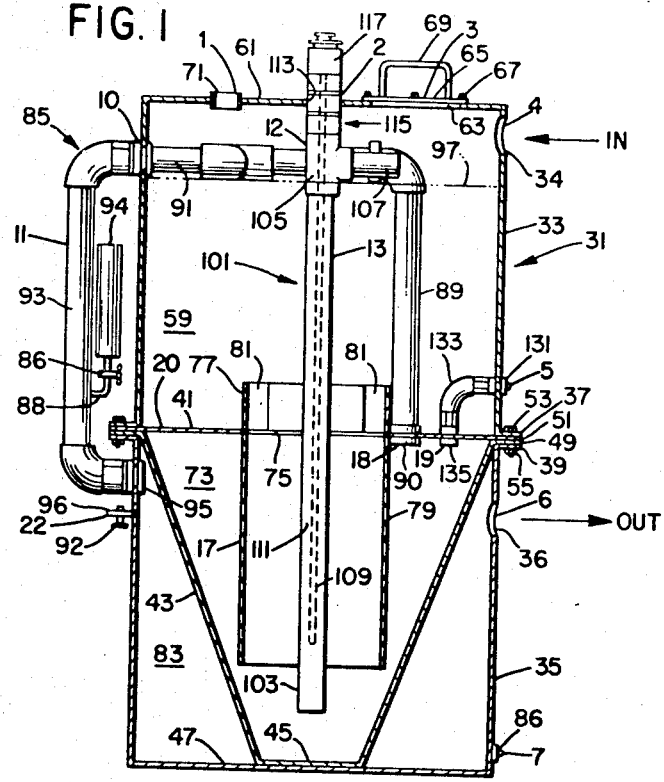
FIG. 1 is an axial vertical section through a treater embodying the invention.

Referring now especially to FIG. 1, and also to other Figures as the context requires, there is shown a sewage treater 31. The treater is of generally cylindrical configuration and includes two similar cylindrical mug-shaped vessels or modules 35, 35. Vessels 33, 35, respectively, inverted and upright, are disposed lip to lip. Ports 34, 36 in vessels 33, 35, respectively, provide an inlet and an outlet to the treater. Ports 34, 36 are to be connected respectively to influent and effluent pipes (not shown).

Flanged Connection

The vessels have outturned radial flanges 37, 39 at their respective lips. A flat circular plate or disc 41 is disposed between the two vessels with its outer periphery between the flanges on the vessels. A truncated conical cup 43 is disposed in the lower or upright vessel 35 with the flat bottom 45 of the cup resting on the flat bottom 47 of the upright vessel. The cup has an outturned radial flange 49 at its upper edge or lip resting on lip flange 39 of the upright vessel. The outer periphery 51 of disc 41 is the same size and shape as flanges 37, 39, and 49 and may be viewed as a flange at the perimeter of the disc. Disc flange 51 rests on the top of cup lip flange 49, and inverted vessel lip 37 rests on flange 51. The four flanges are secured together by fastening means comprising a plurality of bolts 53 and nuts 55, the bolts extending through circumferentially spaced apart holes 57 (FIG. 2) in flange 37 and registering holes in flanges 39, 49, 51.

Aerator

Vessel 33 and disc 41 form an aeration chamber 59. In the flat plate 61 at the top of the aeration chamber (FIG. 2) there is a rectangular access opening 63 which is closed by a rectangular cover plate 65 releasably secured to top plate 61 by a plurality of cap screws 67. Cover 65 has a handle bar 69 welded thereto. The aeration chamber is continuously vented of excess air and other gas such as carbon dioxide via port 71 in plate 61. Normally port 71 will be connected to a vent pipe (not shown) conducting the vented gas to a remote location.

Clarifier and its Connection to Aerator

Cup 43 and disc 41 form clarification chamber 73. Central port 75 in disc 41 connects the aeration chamber 59 with clarification chamber 73. Circular guide 77 extending upwardly from disc 41 around port 75 and circular skirt 79 extending downwardly from disc 41 around port 75 provide baffle means restricting communication between the aeration chamber to the axial or central portions thereof. Preferably guide 77 is discontinuous, there being e.g. three vertical slots or openings 81 therein equally circumferentially spaced apart, whereby the aeration chamber can be completely drained when desired.

Chlorinator and its Connection to Clarifier

Figure 3:
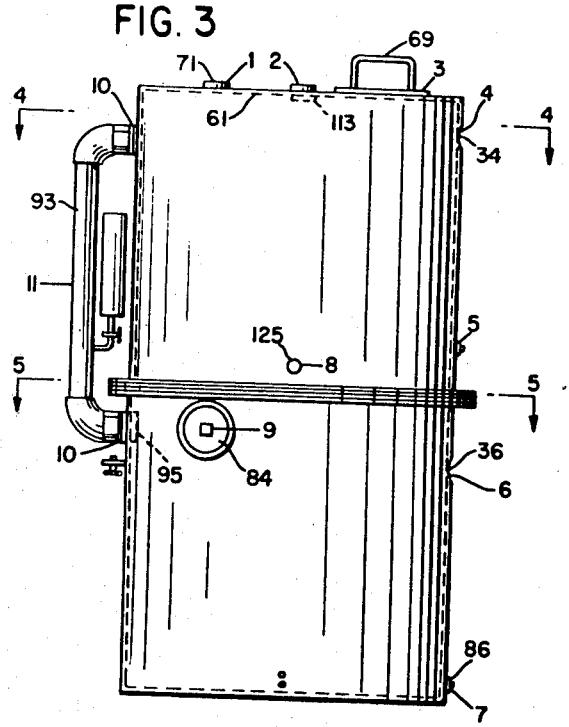
FIG. 3 is a left-side elevation of the treater (considering the right-hand side of the treater as seen in FIG. 1 to be the front)

Vessel 35 and cup 43 form a chlorination chamber or chlorinator 83. An inspection and flushing port in the upper part of the chlorinator is closed by screw plug 84 (FIG. 3). A drain port in the side of the chlorinator near the bottom plate 47 is closed by screw plug 86.

Chlorination contact chamber 83 is connected to clarification chamber or clarifier 73 by conduit 85 which extends in part through aeration chamber or aerator 59. Conduit 85 includes standpipe 89 connected at its lower end to a port 90 in disc 41 located radially outwardly from port 75 and skirt 79. Conduit 85 further includes a horizontal crossover piping 91 which connects the top of standpipe 89 with the top of a downcomer 93 outside of vessels 33 and 35, the downcomer being connected to a port 95 in the side of vessel 35. Port 95 is diametrically opposite from port 91.

It will be seen that the height of standpipe 89, or more precisely the height of the bottom of the interior of crossover piping 91, determines the maximum liquid level 97 in aerator 59.

When the liquid level exceeds the height of the bottom of the interior of piping 91, liquid from the clarifier will overflow standpipe 89 and flow via cross-over 91 into downcomer 93 and then flow into chlorination contact chamber 83. Liquid thus withdrawn from the clarifier will be replaced with liquid from the aerator flowing through port 75 in disc 41.

A tank 94 connects to the side of downcomer 93 in the lower part thereof through a manually adjustable needle valve 86 and pipe 88. Sodium hypochlorite (bleach) or other disinfectant in tank 94 is fed by gravity from tank 94 through downcomer 93 into the chlorinator at a rate determined by the setting of the needle valve. Alternatively, pipe 88 can be connected directly to the chlorinator through inlet pipe 96 controlled by valve 92. Chlorination contact chamber 83 provides the contact time for disinfection.

Sludge Return Line

Clarifier 73 is connected to aerator 59 by sludge return line 101. Line 101 includes a lift pipe 103 passing axially through port 75 and extending downwardly coaxially of vessel 35, cup 43 and skirt 79 to a level below skirt 79, about four inches off the bottom of cup 43 in the exemplary embodiment shown. Pipe 103 extends upwardly to a tee 105 which connects to a side outlet 107 discharging above liquid level 97. Lift air is introduced near the bottom of lift pipe 103 by means of tube 109. Tube 109 is concentric with pipe 103 and has a smaller outer diameter than the inner diameter of pipe 103, leaving an annular flow passage 111 therebetween. Tube 109 extends upwardly through tee 105 and thence through a port 113 in treater top plate 61 sealed by bulkhead packer 115. Exteriorly of the treater, tube 111 connects to coupling 117 which is to be connected to a source of air under pressure (not shown).

It will be seen that air admitted to annulus 111 from tube 109 will lower the density of the fluid (air-liquid-solids mixture) in annulus 111 compared to the density of the fluid outside of pipe 103, causing the fluid in the annulus to rise and discharge above the liquid level in the aerator. In this manner heavy sludge collecting in the bottom of the clarifier wil be drawn into pipe 103 and returned to the aerator to mix with the influent entering at port 34. It will be noted from FIG. 4 that crossover piping 91 curves or bends around the top of the aerator in order to get around the sludge return line 101 from standpipe 90 to downcomer 93 diametrically opposite therefrom.

Aeration

Figure 2:
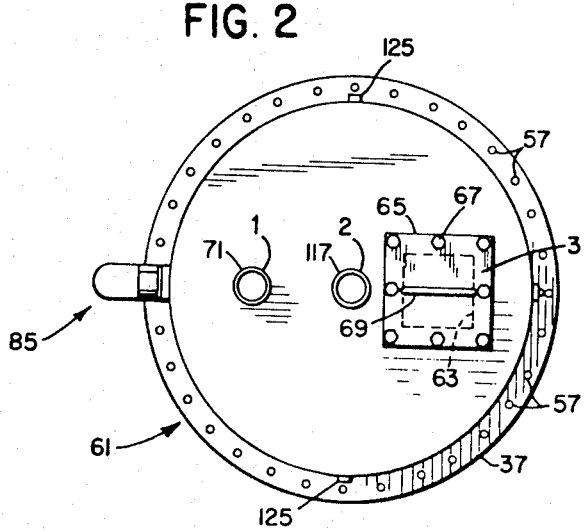
FIG. 2 is a top view of the treater.
Figure 4:
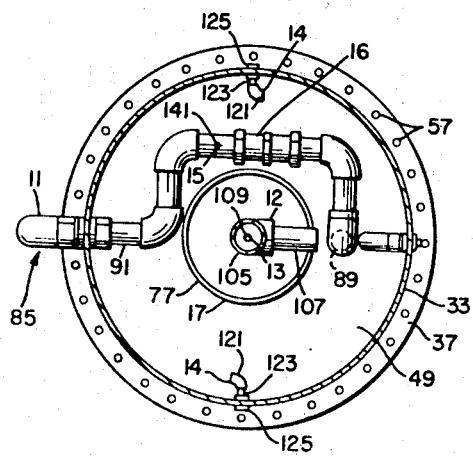
FIGS. 4 and 5 are horizontal sections taken on the planes indicated in FIG. 3.
Figure 5:
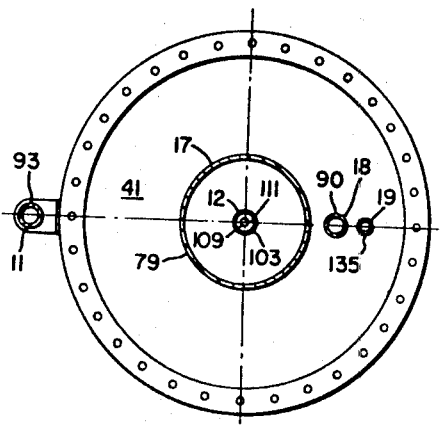

Air under a slight pressure of e.g. 3–5 psi, i.e. sufficient to overcome the liquid head of the treater and operate the airlift of the sludge return line, is admitted to the aeration chamber through two nozzles 121 (FIG. 4) located near the bottom of the aerator and close to the outer periphery thereof. The nozzles are connected to air inlet pipes 123 which pass through ports in the side of vessel 33, the pipes being sealed to the vessel by bulkhead seals 125. As shown in FIGS. 2, 4 and 6 the two nozzles 121 are 180 degrees apart about the cylinder axis of the aeration chamber. However, fewer or additional nozzles may be employed. Preferably, there are employed a plurality of nozzles equally spaced apart about the aerator axis.

The nozzles are disposed with their exit axes directed tangentially, i.e. perpendicular to radii drawn from the axis of the aerator to the nozzles. With this disposition, the air leaving the nozzles is in the form of tangential jets which cause the material in the aerator to travel in a circular path about the aerator axis. Since the jets are below the level of the top of guide 77, the guide helps the jets create the circular motion of the liquid in the aerator.

The circular motion of the fluid (suspension of solids in an air-water mixture) in the aerator will cause the denser material to move to the outer part of the aerator and the less dense material to move to the axial center of the aerator. In other words, there will be a centrifugal separation. When fluid flows from the aerator to the clarifier, it will be less dense, more thoroughly macerated digested fluid which will first leave the aerator. Meanwhile, the denser, less thoroughly macerated and digested material will remain in the aerator at the outer part thereof where friction with the wall of vessel 33 may cause some turbulence and assist in maceration, aeration, and digestion thereof.

General Operation

To operate the treater, the aerator and clarifier are first filled with water through inlet 34 to a level above the bottom of crossover piping 91 in the aerator. The port closed by plug 131 is connected by pipe 133 with a port 135 in disc 41. Any air trapped in the top of the clarifier during the filling of the treater with water will be vented through pipe 133 and then when the water level reaches the top of guide 77 water will emerge via pipe 133, indicating that water in the treater has reached the minimum level for startup. Preferably, further water is admitted until water emerges from discharge port 36 in the clarifier.

Sewage can then be admitted to the treater via inlet port 34. The influent at port 34 will normally be intermittent. The sewage will mix with the water in the bottom of the aerator. Treating air will be admitted to the material in the aerator via nozzles 121 at a rate compatible with the expected average rate of flow of incoming sewage, in an amount sufficient to macerate the solids and cause bacterial aerobic digestion thereof to reduce the sewage to a fine suspension.

When the level of sewage in the aerator reaches the highest level of the bottom of crossover piping 91, water, at first, and then clarified water after the treater has been in operation awhile, will flow up standpipe 89 from the clarifier, through crossover piping 91, and then via downcomer 93 into the chlorinator.

Meanwhile needle valve 86 will have been opened to admit disinfectant (sodium hypochlorite) to the chlorinator from tank 94 at a rate sufficient to reduce the bacteria count in the effluent to a desired level.

Whenever the liquid level in chlorinator 83 rises to the level of outlet port 86, liquid will flow out to a holding tank (not shown) or to another place of disposal. The holding tank (or chlorinator 83 itself) may be continuously or periodically pumped out.

During the period liquid suspension from the aerator is at rest in the clarifier, solids may settle out in the bottom of the clarifier as a sludge. The solids are guided to the center of the bottom of the clarifier by the sloping conical sides of the clarifier. The sludge is continuously or intermittently removed from the bottom of the clarifier by sludge return line 103. The sludge is discharged into the top of the aerator near the point where fresh sewage enters; by this arrangement incoming sewage is mixed with bacteria-rich sludge to insure immediate commencement of the digestion process when air is added to the sewage in the aerator.

Crossover pipe 91 is provided with an anti-siphon vent 141 venting the high side of piping 91 to the aeration chamber. For a further description of this function see U.S. Pat. application Ser. No. 746,052, filed Nov. 29, 1976, entitled "SEWAGE DISPOSAL SYSTEM".

The treater is intended especially for use on board ship. Should the ship roll or pitch and incline the cylinder axis of the treater relative to the vertical, fluid in the aerator will rise relative to one side of the aerator. Should the direction of the inclination or a component thereof be toward standpipe 89, liquid will rise in standpipe 89. However, such rise will not itself cause additional flow of fluid from the aerator to the clarifier, for at the same time the top of downcomer 93 will be elevated. Downcomer 93 being diametrically opposite from standpipe 89, downcomer 93 will always go up when standpipe 89 goes down. Therefore, inclination of the treater axis to the vertical will not cause the aerator to be prematurely discharged, i.e. discharged before the level of the fluid therein, when the treater is uninclined, is below the bottom of crossover piping 91. For a further discussion of this problem and another solution thereof see United States patent application executed Oct. 2, 1979, entitled "SEWAGE DISPOSAL SYSTEM".

As liquid flows out of the clarifier via standpipe 89, additional fluid enters the clarifier via port 75. Guide 77 serves also as a baffle, preventing dense solids at the bottom of the aerator from leaving the aerator. Such solids will ultimately be reduced by the macerating action of the air jets in the annulus formed between guide 77 and vessel 33 and then digested as they swirl around in the aerator at a level above such maceration annulus in the upper or digestion portion of the aerator, ultimately to leave as fine solids in suspension via the core portion of the aerator around the axis thereof above port 75. Such suspension falling from the core of the aerator through port 75 will enter the clarifier through skirt 79, which also forms a conduit. The suspension flows down the inside of such conduit or skirt 79 to the lower part of the clarifier near but somewhat above the lower end of sludge return line 103. The skirt or conduit 79 thus keeps the suspension entering from the aerator out of contact with the relatively quiescent contents of the clarifier outside skirt 79 above the lower end of the skirt. This permits continuous fallout of solids from the upper part of the clarifier to the lower part thereof, the velocity of the liquid being lower in such upper part of the clarifier than inside of skirt 79. In addition, material in the liquid with a specific gravity less than 1 will float back up through conduit or skirt 79 and eventually be displaced back into the aerator 59.

It will then be seen that the centrifugal separation in the aerator is supplemented by the gravity separation in the clarifier.

Specifications

Certain typical specifications for the treater are as follows as an example:
Air pressure 4 psi (pounds per square inch)
Air flow from nozzles 5 cfm (cubic feet per minute)
Chamber volumes See drawings

Conclusion

While a preferred embodiment of the invention has been shown and described, many modifications can be made by one skilled in the art without departing from the spirit of the invention. For example, the circular motion of the fluid in the aerator is a special case of orbital motion which might be non-circular, e.g. in an aerator of non-circular shape.

We claim:

1. A sewage treater comprising an aerator, a clarifier, and a disinfector,
   said clarifier being disposed beneath said aerator and the top of the clarifier with a common wall therebetween forming the bottom of the aerator,
   first passage means to conduct fluid from the aerator to the clarifier,
   said first passage means comprising a central port in said common wall and circular guide baffle means around said port,
   and second passage means to conduct fluid from the clarifier to disinfector, said aerator having an influent inlet, said disinfector having an effluent outlet,
   said treater being distinguished in that said aerator includes a vessel and nozzle means for admitting air to the vessel in a direction to cause fluid in the vessel to move orbitally about a vertical axis,
   said nozzle means being disposed at a level below the top of said guide baffle means.

2. Treater according to claim 1,
   said vessel having a circular cross section said vertical axis passing through the center of said circular section, said orbital motion being a circular motion about said axis.

3. Treater according to claim 1,
   said means for admitting air comprising a plurality of nozzles directed tangentially with respect to said axis and at circumferentially spaced apart equal distances about said axis.

4. Treater according to claim 1,
   said clarifier being of truncated conical configuration concentric with said aerator, said common wall being a flat disc, said first passage means further including a skirt depending from said disc about said port forming conduit means to conduct fluid from said port to near the bottom of said clarifier and forming baffle means to provide a quiescent volume in the clarifier outside of said skirt.

5. Treater according to claim 4,
   said disinfector comprising a flat bottomed vessel of circular cross-section within which said conical clarifier is nested coaxially,
   said clarifier having a flat bottom resting on the flat bottom of said disinfector.

6. Treater according to claim 5,
   said clarifier being connected to said aerator by third passage means including a sludge return line coaxial with said disinfector, clarifier, and aerator extending from near the bottom of said clarifier below said skirt to near the top of said aerator adjacent said inlet, said third passage means further including an air pipe coaxial with said line and having a smaller outer diameter than the inner diameter of said line and extending from near the bottom of said line upwardly to the top of said aerator.

7. Treater according to claim 6,
   said second fluid passage means including an off center port in said common wall disposed at one side of said central port, a standpipe in said aerator rising from said aerator diametrically opposite from said standpipe with respect to the axis of the aerator diametrically opposite from said standpipe with respect to the axis of the aerator, and crossover piping extending from the top of the standpipe around the sludge return line to the tip of the downcomer, the lower end of the downcomer being connected to the side of the clarifier above the bottom of said skirt.

8. Treater according to claim 7,
   the aerator vessel having the shape of an inverted mug with an outturned flange at the lip of the mug, the disinfector vessel having the shape of an upright mug of the same size and shape as the aerator vessel with a like outturned flange at the lip of the upright mug, the clarifier having the shape of a truncated conical cup with an outturned flange at the lip of the cup, said common wall being in the shape of a flat disc having a flat outer periphery forming a flange, said flanges of the disc and cup being captured between said flanges of said aerator and disinfector,
   said flanges being secured together by bolt means passing through a plurality of circumferentially spaced holes in the flange of said aerator and registering holes in the other three flanges.

9. Treater according to claim 8
   including a port in the top of the aerator continuously venting the aerator,
   a vent in said crossover piping to said aerator,
   slots in said guide baffle means extending to the bottom of said aerator,
   a third port in said common wall connected by piping extending through said aerator to a port in the side of the aerator at the level of the top of said guide baffle means and normally closed by a screw plug,
   a normally closed drain hole means in the side of the disinfector near the bottom thereof,
   normally closed access ports means in the side of the disinfector and top of the aerator,
   a disinfectant tank connected through a manually adjustable needle valve to said downcomer in the lower part thereof, and
   a normally closed port for making connection of the disinfectant tank directly to the disinfector.

10. A sewage treater comprising an aerator, a clarifier, and a disinfector,
    said clarifier being disposed beneath said aerator and the top of the clarifier with a common wall therebetween forming the bottom of the aerator,
    first passage means to conduct fluid from the aerator to the clarifier,
    said first passage means comprising a central port in said common wall,
    and second passage means to conduct fluid from the clarifier to disinfector, said aerator having an influent inlet, said disinfector having an effluent outlet,
    said treater being distinguished in that said aerator includes a vessel and nozzle means for admitting air to the vessel in a direction to cause fluid in the vessel to move orbitally about a vertical axis,
    said nozzle means being disposed at a level proximate the common wall between said aerator and clarifier.

* * * * *